(12) United States Patent
Moon

(10) Patent No.: US 9,790,900 B2
(45) Date of Patent: Oct. 17, 2017

(54) AIR CLEANER STRUCTURE FOR BLOCKING INFLOWING OF DEBRIS AND OPERATION METHOD THEREOF

(71) Applicant: HYUNDAI MOTOR COMPANY, Seoul (KR)

(72) Inventor: Byoung-Youp Moon, Gwangju (KR)

(73) Assignee: Hyundai Motor Company, Seoul (KR)

( * ) Notice: Subject to any disclaimer, the term of this patent is extended or adjusted under 35 U.S.C. 154(b) by 44 days.

(21) Appl. No.: 14/716,736

(22) Filed: May 19, 2015

(65) Prior Publication Data
US 2016/0131093 A1     May 12, 2016

(30) Foreign Application Priority Data
Nov. 10, 2014 (KR) ........................ 10-2014-0155342

(51) Int. Cl.
| | | |
|---|---|---|
| B01D 46/10 | (2006.01) | |
| F02M 35/024 | (2006.01) | |
| B01D 46/00 | (2006.01) | |
| B01D 46/24 | (2006.01) | |
| B01D 46/42 | (2006.01) | |

(52) U.S. Cl.
CPC ..... F02M 35/02416 (2013.01); B01D 46/008 (2013.01); B01D 46/009 (2013.01); B01D 46/0091 (2013.01); B01D 46/2411 (2013.01); B01D 46/4272 (2013.01); F02M 35/02483 (2013.01)

(58) Field of Classification Search
CPC  B01D 46/10; B01D 46/0019; B01D 46/0095; B01D 46/0002; B01D 46/2403; F02M 35/02483; F02M 35/024

USPC ................ 55/385.3, 419, 498, 502, DIG. 28; 123/198 E
See application file for complete search history.

(56) References Cited

U.S. PATENT DOCUMENTS

| | | | | |
|---|---|---|---|---|
| 5,466,189 A | * | 11/1995 | Deutsch | .................. F01P 11/12 460/100 |
| 5,653,207 A | * | 8/1997 | Denton | ..................... F16K 1/18 123/198 D |
| 6,395,048 B1 | * | 5/2002 | Yoder | .................... B01D 46/44 123/198 E |
| 6,425,930 B1 | * | 7/2002 | Wake | ................. B01D 46/0095 123/198 E |

(Continued)

FOREIGN PATENT DOCUMENTS

| | | |
|---|---|---|
| JP | 5-21160 U | 3/1993 |
| JP | 5-83353 U | 11/1993 |

(Continued)

*Primary Examiner* — Jacob T Minskey
*Assistant Examiner* — Minh-Chau Pham
(74) *Attorney, Agent, or Firm* — McDermott Will & Emery LLP

(57) ABSTRACT

An air cleaner structure for blocking an inflow of debris to prevent the debris from inflowing into an engine intake passage of an air cleaner housing when replacing a filter includes a rotator fixing the filter and a filter cover to the air cleaner housing and generating a rotating force to open and close the engine intake passage. An engine intake passage door opens and closes the engine intake passage by the rotating force of the rotator. A connector has one end connected to the rotator and another end connected to the engine intake passage door to deliver the rotating force to the engine intake passage door.

2 Claims, 11 Drawing Sheets

(56) References Cited

U.S. PATENT DOCUMENTS

| | | | | |
|---|---|---|---|---|
| 6,766,782 B1* | 7/2004 | Martin | ............... | F02M 35/024 |
| | | | | 123/198 E |
| 8,439,996 B2* | 5/2013 | Sakashita | ........... | B01D 46/0065 |
| | | | | 55/295 |
| 2010/0071323 A1* | 3/2010 | Cosgrove | .......... | B01D 46/0002 |
| | | | | 55/357 |
| 2013/0154131 A1* | 6/2013 | Hou | ......................... | F24F 6/02 |
| | | | | 261/24 |
| 2016/0061159 A1* | 3/2016 | Ryon | ............... | B01D 46/0002 |
| | | | | 55/357 |

FOREIGN PATENT DOCUMENTS

| | | |
|---|---|---|
| JP | 6-76645 U | 10/1994 |
| JP | 7-25266 U | 5/1995 |
| JP | 7-35749 U | 7/1995 |
| JP | 2007-064025 A | 3/2007 |
| JP | 2014168733 A | 9/2014 |
| KR | 20040080677 A | 9/2004 |
| KR | 20040095372 A | 11/2004 |
| WO | 2004/039476 A1 | 5/2004 |

\* cited by examiner

AIR CLEANER STRUCTURE FOR BLOCKING INFLOWING OF DEBRIS AND OPERATION METHOD THEREOF

CROSS-REFERENCE TO RELATED APPLICATIONS

This application claims the benefit of priority to Korean Patent Application No. 10-2014-0155342, filed on Nov. 10, 2014, which is incorporated herein by reference in its entirety.

TECHNICAL FIELD

The present disclosure relates to an air cleaner structure for blocking an inflow of debris and an operation method thereof, and more particularly, to an air cleaner structure for blocking an inflow of debris and an operation method thereof capable of preventing the debris from inflowing into an engine when replacing and cleaning a filter.

BACKGROUND

Air is supplied to an internal combustion engine of a vehicle from outside so as to combust fuel during an operation of the engine. When the air inflowing from the outside includes dusts, friction between an inner wall of a cylinder and an outer surface of a piston is increased, thus reducing the lifespan of the engine. A conventional engine has an inlet of an intake manifold forming a distribution passage of air and coupled with an air cleaner. The air cleaner filters debris in the atmosphere to supply purified air to the engine. Therefore, the air cleaner reduces abrasion of an engine piston ring to maintain engine performance.

However, when the inflow of debris is excessive, ventilating resistance is increased, which affects an engine output. Therefore, after the air cleaner is used for a predefined period of time, a filter of the air cleaner needs to be replaced. FIGS. 1A and 1B are diagrams illustrating an air cleaner structure in accordance with the related art. Debris may flow into an engine through an engine intake passage at the time of replacing or cleaning a filter of an air cleaner in accordance with the related art, thus deteriorating the engine piston ring.

To solve the above problem, a structure in which two filters are mounted as a main element with a safety element (see FIG. 1B). Therefore, even though the main element is cleaned or replaced, it is possible to block the debris from inflowing into the engine due to the safety element. However, the safety element is additionally required, which needs to be replaced after using for a predetermined period of time, thereby increase cost.

SUMMARY

An aspect of the present inventive concept provides an air cleaner structure for blocking an inflow of debris and an operation method thereof capable of preventing the debris from inflowing into an engine through an engine intake passage when replacing and cleaning a filter without a separate safety element.

Other objects and advantages of the present inventive concept can be understood by the following description, and become apparent with reference to embodiments of the present inventive concept. Also, it is obvious to those skilled in the art to which the present inventive concept pertains that the objects and advantages of the present inventive concept can be realized by the means as claimed and combinations thereof.

In accordance with an embodiment of the present inventive concept, an air cleaner structure for blocking an inflow of debris into an engine intake passage of an air cleaner housing when replacing a filter includes a rotator fixing the filter and the filter cover to the air cleaner housing and generating a rotating force to open and close the engine intake passage. An engine intake passage door opens and closes the engine intake passage by the rotating force of the rotator. A connector has one end connected to the rotator and another end connected to the engine intake passage door to deliver the rotating force of the rotator to the engine intake passage door.

The rotator may include a nut which fixes the filter and the filter cover to the air cleaner housing.

The rotator may include a rod, an outer circumferential surface of which has a thread connected to the nut.

The rotator may include a locker interposed between the nut and the rod to deliver the rotating force to the rod.

The rod may have a longitudinal groove on an outer circumferential surface thereof to be fastened with the locker.

The connector may include a first opening and closing gear which is connected to and rotates together with a rod.

The connector may include a first connection gear engaged and rotating with the first opening and closing gear.

The connector may include a flexible cable, one end of which is connected to the first connection gear to rotate together with the first connection gear.

The connector may include a second connection gear which is connected to another end of the flexible cable to rotate together with the flexible cable.

The connector may include a second opening and closing gear engaged and rotating with the second connection gear. The second opening and closing gear may change an axis direction of the rotating force of the second connection gear and deliver the rotating force to the engine intake passage door.

The connector may include a supporter connected to the air cleaner housing and rotatably supporting the flexible cable and the rod.

The engine intake passage door may include a rotating shaft connected to and rotate together with a second opening and closing gear.

The engine intake passage door may include a butterfly plate which is connected to the rotating shaft to open and close the engine intake passage of the air cleaner housing while rotating together with the rotating shaft.

In accordance with another embodiment of the present inventive concept, an operation method of an air cleaner structure for blocking an inflow of debris includes using a locker to fasten nut with a rod in a first locking step. The nut rotates to allow the butterfly plate to close an engine intake passage in a first rotating step. The nut fastened with the rod is disengaged from the rod by the locker in a first disengaging step. The nut is withdrawn from the rod in a withdrawing step. A filter is replaced in a replacing step.

The operation method may further include rotating the nut to connect the nut to the rod and fixing the filter and the filter cover to a supporter which is connected to the air cleaner housing in a connecting step. The locker is used to fasten the nut with the rod in a second locking step. The nut rotates to allow the butterfly plate to open the engine intake passage in a second rotating step. The nut fastened with the rod is withdrawn from the rod by the locker in a second withdrawing step.

DETAILED DESCRIPTION

Terms used in the present specification and claims are not to be construed as a general or dictionary meaning but are to be construed meaning and concepts meeting the technical ideas of the present disclosure based on a principle that the inventors can appropriately define the concepts of terms in order to describe their own invention in best mode. Therefore, the configurations described in exemplary embodiments and drawings of the present inventive concept are merely exemplary embodiments but do not represent all of the technical spirit of the present inventive concept. Thus, the present disclosure should be construed as including all the changes, equivalents, and substitutions included in the spirit and scope of the present inventive concept at the time of filing this application. In the present specification, an overlapped description and a detailed description for well-known functions and configurations that may obscure the gist of the present inventive concept will be omitted. Hereinafter, exemplary embodiments of the present inventive concept will be described in detail with reference to the accompanying drawings.

Figure 1A:
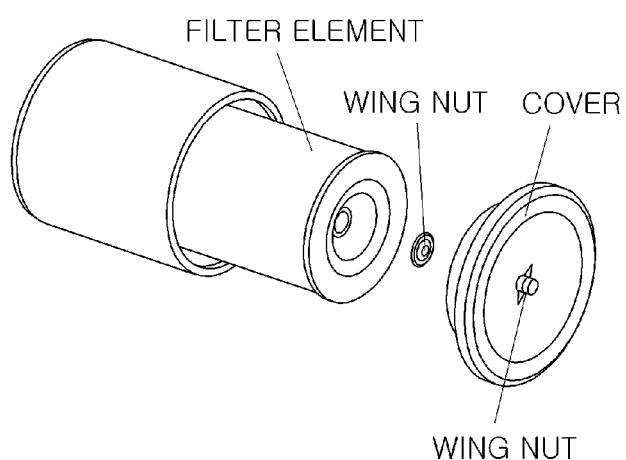
FIGS. 1A and 1B are diagrams illustrating an air cleaner structure in accordance with the related art.
Figure 1B:
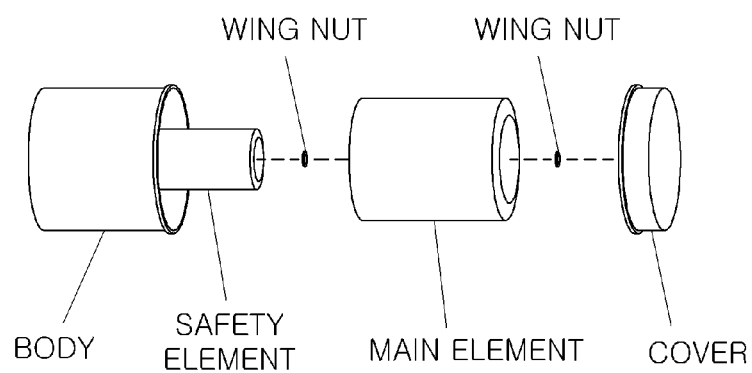
Figure 2:
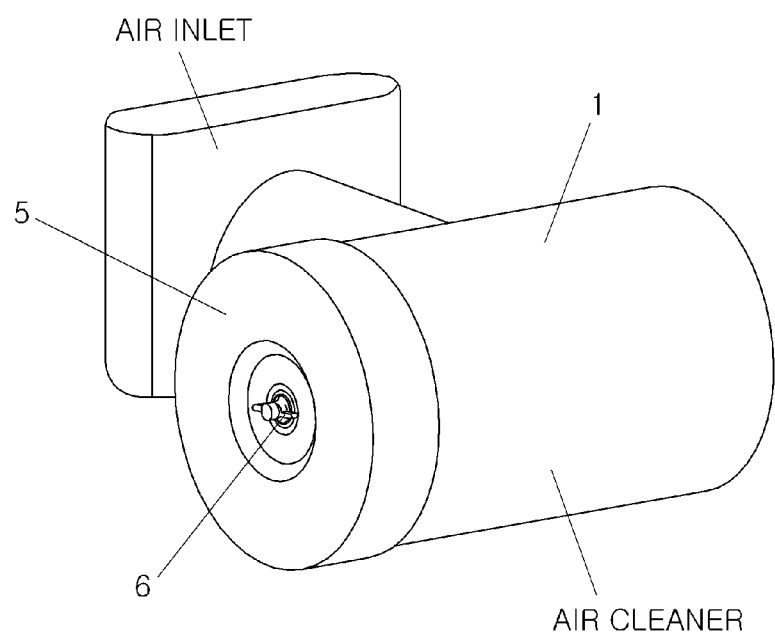
FIG. 2 is a front perspective view of an air cleanser structure for blocking an inflow of debris in accordance with an exemplary embodiment of the present inventive concept.
Figure 3:
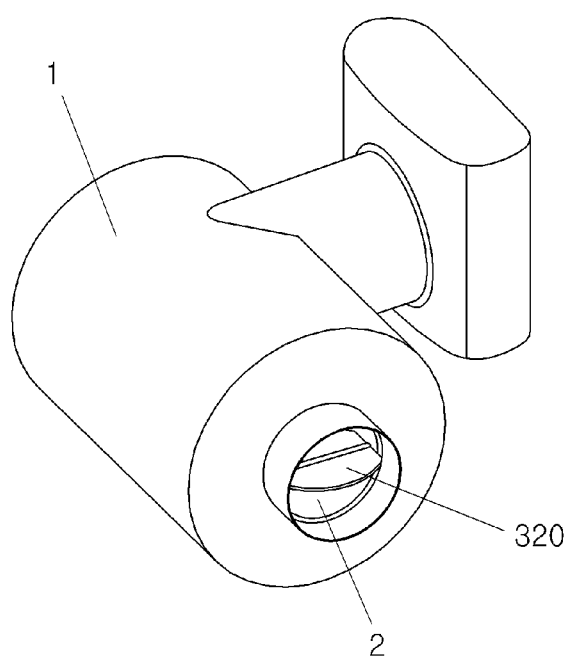
FIG. 3 is a rear perspective view of the air cleanser structure for blocking an inflow of debris in accordance with an exemplary embodiment of the present inventive concept.
Figure 4:
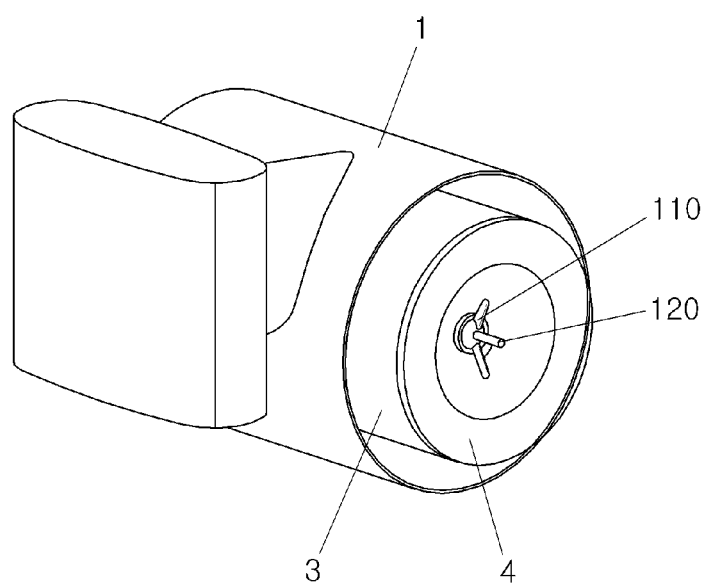
FIG. 4 is a diagram illustrating a state in which a cover is separated from the air cleanser structure for blocking an inflow of debris in accordance with an exemplary embodiment of the present inventive concept.
Figure 5:
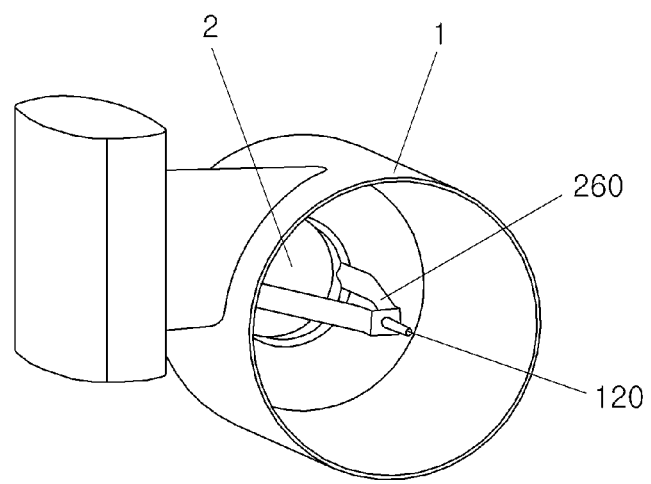
FIG. 5 is a diagram illustrating a state in which a filter and a filter cover are separated from the air cleanser structure for blocking an inflow of debris in accordance with an exemplary embodiment of the present inventive concept.
Figure 6:
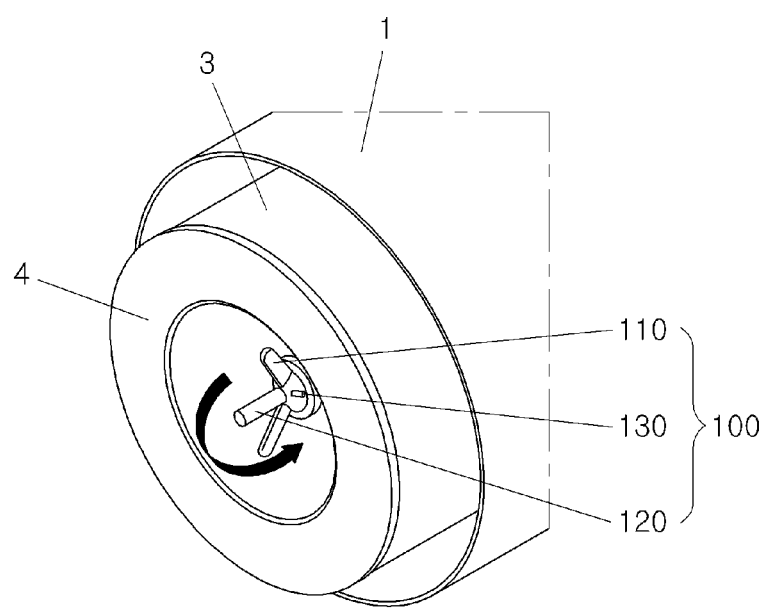
FIG. 6 is an enlarged view of a rotator of the air cleanser structure for blocking an inflow of debris in accordance with an exemplary embodiment of the present inventive concept.
Figure 7:
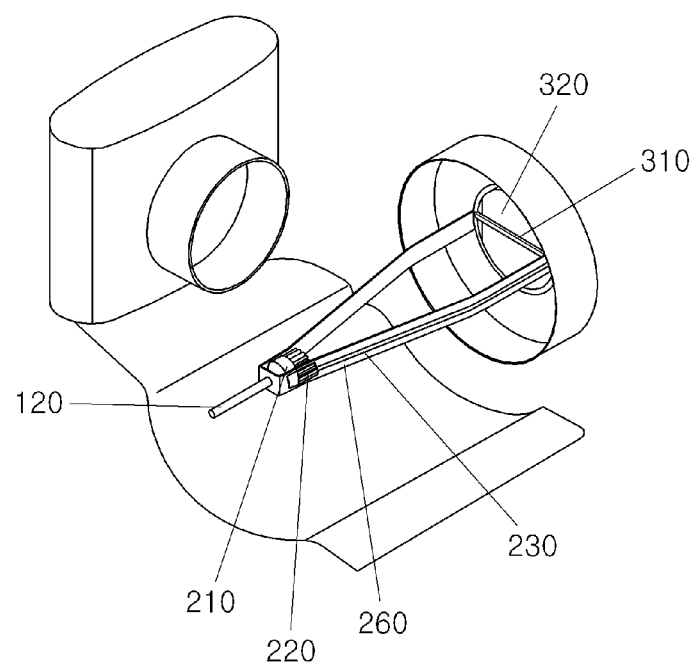
FIGS. 7 and 8 are diagrams illustrating a state in which an air cleaner housing is removed from the air cleanser structure for blocking an inflow of debris in accordance with an exemplary embodiment of the present inventive concept.
Figure 8:
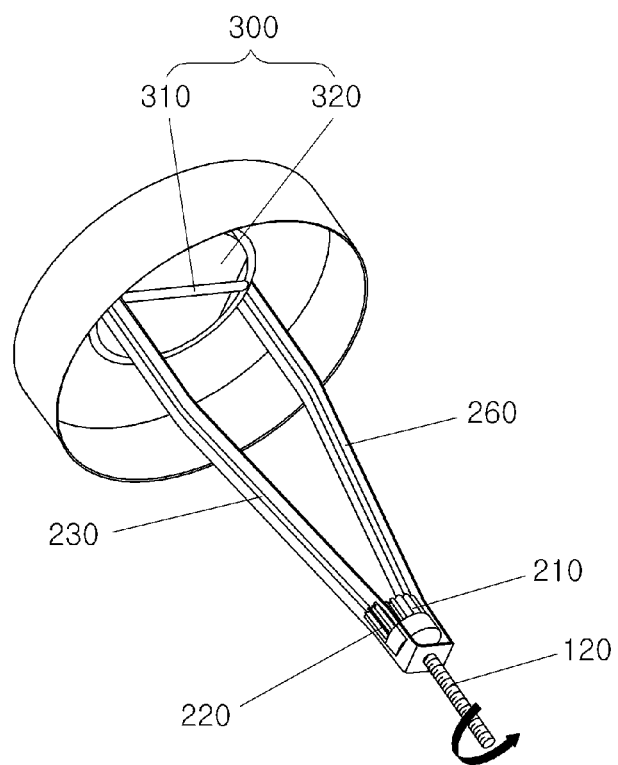
Figure 9:
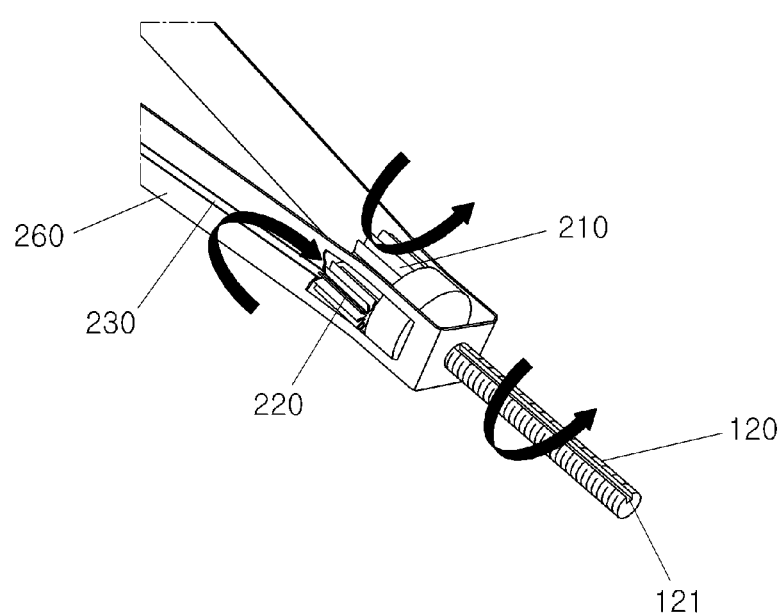
FIG. 9 is an enlarged view of a connector of the air cleanser structure for blocking an inflow of debris in accordance with an exemplary embodiment of the present inventive concept.
Figure 10:
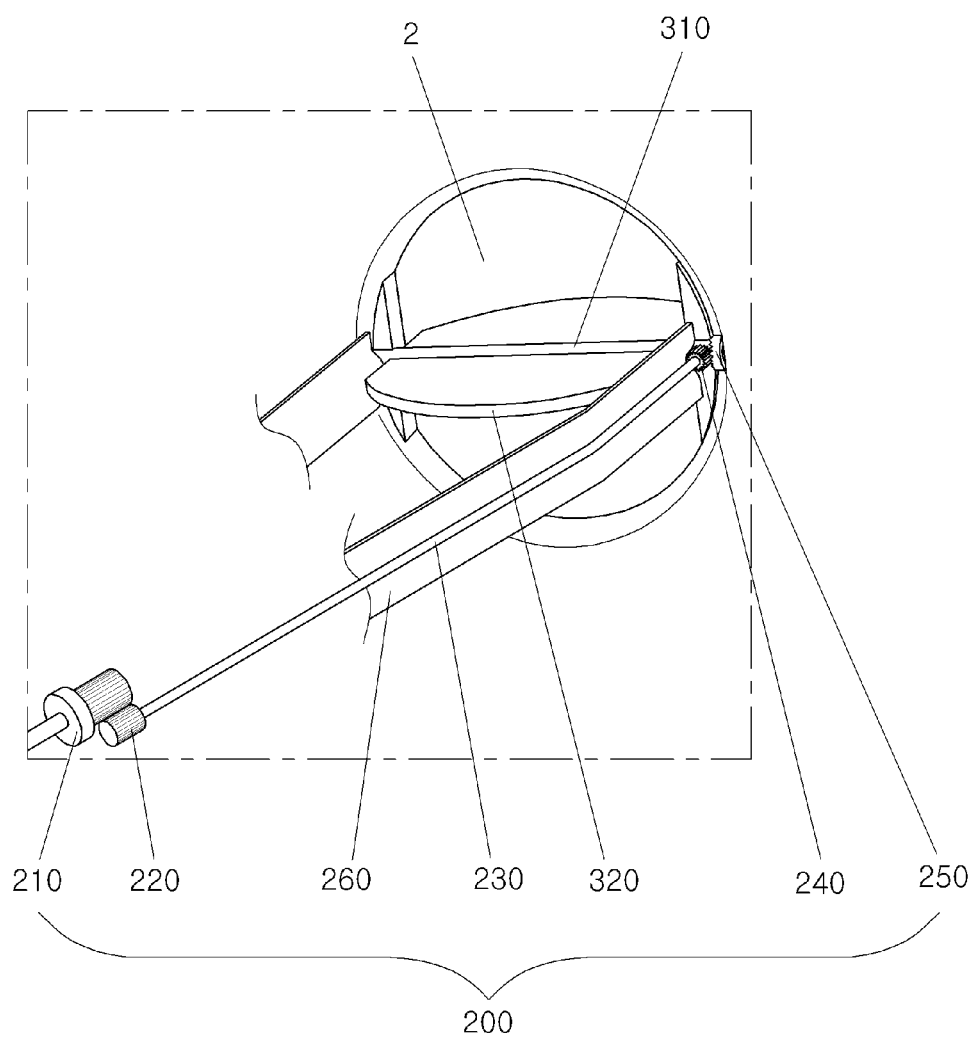
FIG. 10 is an enlarged view of an engine intake passage door of the air cleanser structure for blocking an inflow of debris in accordance with an exemplary embodiment of the present inventive concept.

FIG. 2 is a front perspective view of an air cleanser structure for blocking an inflow of debris in accordance with an exemplary embodiment of the present inventive concept. FIG. 3 is a rear perspective view of the air cleanser structure for blocking an inflow of debris in accordance with an exemplary embodiment of the present inventive concept. FIG. 4 is a diagram illustrating a state in which a cover is separated from the air cleanser structure for blocking an inflow of debris in accordance with an exemplary embodiment of the present inventive concept. FIG. 5 is a diagram illustrating a state in which a filter and a filter cover are separated from the air cleanser structure for blocking an inflow of debris in accordance with an exemplary embodiment of the present inventive concept. FIG. 6 is an enlarged view of a rotator of the air cleanser structure for blocking an inflow of debris in accordance with an exemplary embodiment of the present inventive concept. FIGS. 7 and 8 are diagrams illustrating a state in which an air cleaner housing is removed from the air cleanser structure for blocking an inflow of debris in accordance with an exemplary embodiment of the present inventive concept. FIG. 9 is an enlarged view of a connector of the air cleanser structure for blocking inflowing of debris in accordance with an exemplary embodiment of the present inventive concept. FIG. 10 is an enlarged view of an engine intake passage door of the air cleanser structure for blocking an inflow of debris in accordance with an exemplary embodiment of the present inventive concept. Referring to FIGS. 2 to 10, an air cleanser structure for blocking an inflow of debris in accordance with an exemplary embodiment of the present inventive concept includes a rotator 100, a connector 200, and an engine intake passage door 300.

The rotator 100 fixes a filter 3 and a filter cover 4 to an air cleanser housing 1. Further, the rotator 100 applies a rotating force so as to allow the air cleaner structure for blocking an inflow of debris to open and close an engine intake passage 2. The rotator 100 includes a nut 110, a rod 120, and a locker 130.

The nut 110 fixes the filter 3 and the filter cover 4 to the air cleaner housing 1. Further, the nut 110 is applied with the rotating force so as to allow the air cleaner structure for blocking the inflowing of debris to open and close the engine intake passage 2. The nut 110 may be a wing nut, but is not limited thereto.

The rod 120 has a rod shape having an outer circumferential surface provided with a thread which is connected to the nut 110. Therefore, the nut 110 and the rod 120 are coupled with each other by a nut-bolt.

The locker 130 is interposed between the nut 110 and the rod 120. The outer circumferential surface of the rod 120 has a longitudinal groove 121 so as to be fastened with the locker 130. For example, the locker 130 has a bar shape which penetrates through the nut 110. When the locker 130 is inserted into the groove 121, the locker 130 may deliver the rotation force of the nut 110 to the rod 120. However, the locker 130 is not limited thereto, but any component to integrally rotate the nut 110 and the rod 120 may be the locker 130.

The connector 200 has one end connected to the rotator 100, and another end connected to the engine intake passage door 300 thus to deliver the rotating force of the rotator 100 to the engine intake passage door 300. The connector 200 includes a first opening and closing gear 210, a first connection gear 220, a flexible cable 230, a second connection gear 240, a second opening and closing gear 250, and a supporter 260.

The first opening and closing gear 210 of the connector 2101 is connected to the rod 120 to rotate together with the rod 120. The first connection gear 220 is engaged with the first opening and closing gear 210 and rotates. That is, the first opening and closing gear 210 and the first connection gear 220 rotate in an opposite direction to each other.

The flexible cable 230 has one end connected to the first connection gear 220 to rotate together with the first connection gear 220. The second connection gear 240 is connected to another end of the flexible cable 230 to rotate together with the flexible cable 230. The second opening and closing gear 250 is engaged with the second connection gear 240 and rotates. The second opening and closing gear 250 changes an axis direction of the rotating force of the second connection 240 and delivers the rotating force to the engine intake passage door 300. The second connection gear 240 and the second opening and closing gear 250 may be a bevel gear as an intersecting shaft gear, but it is not limited thereto. Any component to deliver the rotating force between two shafts may be used.

The supporter 260 is connected to the air cleaner housing 1 and rotatably supports the flexible cable 230 and the rod 120. The supporter 260 may have a V-letter shape. The supporter 260 may have a first through hole through which the rod 120 penetrates at a center thereof and a second through hole through which the first opening and closing gear 210 and the first connection gear 220 are engaged with each other at a side thereof.

The engine intake passage door 300 opens and closes the engine intake passage 2 by the rotating force of the rotator 100. The engine intake passage door 300 includes a rotating shaft 310 and a butterfly plate 320. The rotating shaft 310 has one end connected to the second opening and closing gear 250 to rotate together with the second opening and closing gear 250. The butterfly plate 320 is connected to the rotating shaft 310 to rotate together with the rotating shaft 310, thereby opening and closing the engine intake passage 2 of the air cleaner housing 1. Thus, it the inflowing of debris into the engine through the engine intake passage 2 at the time of exchanging or cleaning the filter 3 can be prevented without an additional safety element by opening and closing the engine intake passage 2.

Figure 11:
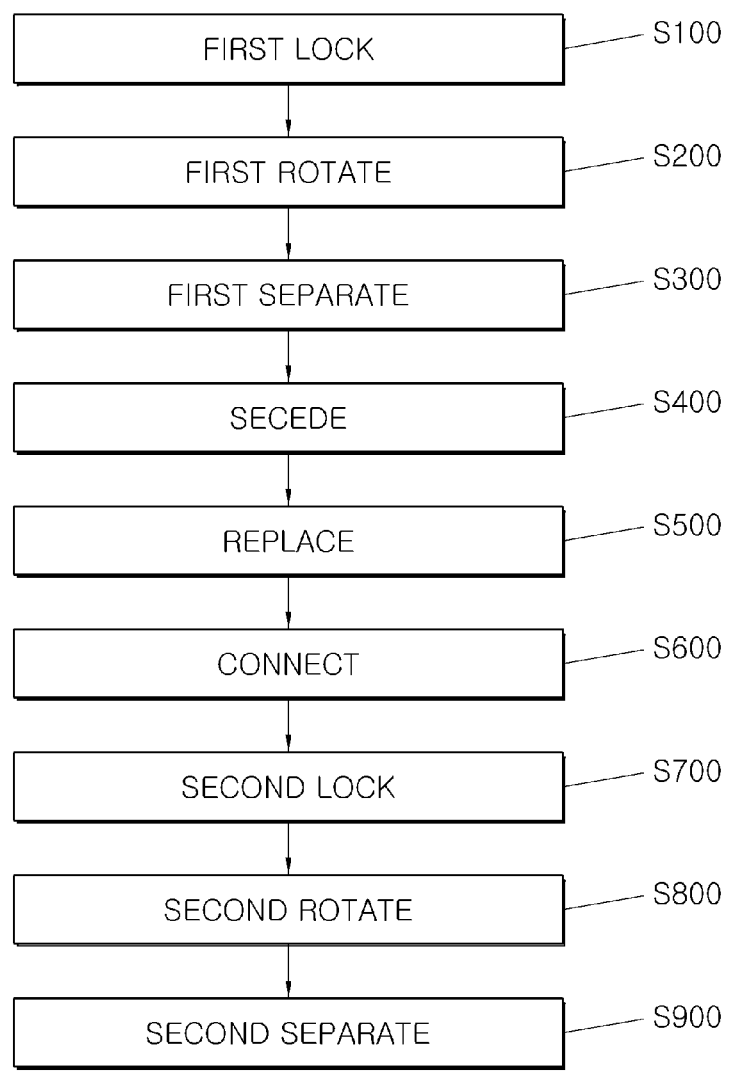
FIG. 11 is a flow chart of an operation method of an air cleanser structure for blocking an inflow of debris in accordance with an exemplary embodiment of the present inventive concept.

FIG. 11 is a flow chart of an operation method of an air cleanser structure for blocking an inflow of debris in accordance with an exemplary embodiment of the present inventive concept. Referring to FIG. 11, the operation method of an air cleanser structure for blocking an inflow of debris in accordance with the present disclosure includes a first locking step (S100), a first rotating step (S200), a first disengaging step (S300), a withdrawing step (S400), a replacing step (S500), a connecting step (S600), a second locking step (S700), a second rotating step (S800), and a second disengaging step (S900).

The locker 130 is used to fasten the nut 110 with the rod 120 in the first locking step (S100), in which the locker 130 has a bar shape and penetrates through the nut 110. For example, the locker 130 in the groove 121 of the rod 120 to enable the locker 130 to deliver the rotation force of the nut 110 to the rod 120 in the first locking step (S100). However, the locker 130 is not limited thereto, but any component to integrally rotate the nut 110 and the rod 120 may be used for the locker 130.

After the first locking step (S100), the nut 110 rotates to allow the butterfly plate 320 to close the engine intake passage 2 in the first rotating step (S200). That is, after the first locking step (S100), when the nut 110 rotates, the rotating force of the nut 110 is delivered to the rod 120. Therefore, the first opening and closing gear 210 which is directly or indirectly connected to the rod 120, the first connection gear 220, the flexible cable 230, the second connection gear 240, and the second opening and closing gear 250 rotate. Further, the hinge shaft 310, which is directly or indirectly connected to the second opening and closing gear 250, and the butterfly plate 320 rotate to close the engine intake passage 2.

After the first rotating step (S200), the nut 110 fastened with the rod 120 is disengaged from the rod 120 by the locker 130 in the first disengaging step (S300). For example, the nut 110 is disengaged from the groove 121 of the rod 120 to prevent the rotation force of the nut 110 from being delivered to the rod 120 in the first disengaging step.

After the first disengaging step (S300), the nut 100 rotates to withdraw the nut 110 from the rod 120 in the withdrawing step (S400). The nut 110 fixes the filter 3 and the filter cover 4 to the air cleaner housing 1, and therefore to replace the filter 3, the nut 100 is withdrawn from the rod 120.

After the withdrawing step (S400), the filter 3 is replaced in the replacing step (S500). When debris excessively inflows into the air cleaner, ventilating resistance is increased, which adversely affects engine performance. Therefore, after the air cleaner is used for a predetermined period of time, the filter 3 of the air cleaner needs to be replaced. In this case, the filter cover 4 is first separated, and then, the used filter 3 is separated from the air cleaner housing 1. Next, after a new filter 3 is mounted in the air cleaner housing 1, the filter cover 4 is mounted in the air cleaner.

After the replacing step (S500), the nut 110 rotates to connect the nut 110 to the rod 120 and the filter 3 and the filter cover 4 are fixed to the supporter 260 which is connected to the air cleaner housing 1. That is, the filter 3 and the filter cover 4 are penetrated by the rod 120 and are fixed to the air cleaner housing 1 by the nut 110 and the supporter 260.

After the connecting step (S600), the locker 130 is used to fasten the nut 110 with the rod 120 in the second locking step (S700). For example, the locker 130, which has a bar shape and penetrates through the nut 100, is fitted in the groove 121 of the rod 120 to deliver the rotation force of the nut 110 to the rod 120 by the locker 130. However, it is not limited thereto, but a component to integrally rotate the nut 110 and the rod 120 may be used for the locker 130.

After the second locking step (S700), the nut 110 rotates to allow the butterfly plate 320 to open the engine intake passage 2 in the second rotating step (S800). The nut 100 rotates in the opposite direction in the second rotating step (S800) to the rotation direction in the first rotating step (S100). That is, after the second locking step (S100), when the nut 110 rotates, the rotating force of the nut 110 is delivered to the rod 120. Therefore, the first opening and closing gear 210 which is directly or indirectly connected to the rod 120, the first connection gear 220, the flexible cable 230, the second connection gear 240, and the second opening and closing gear 250 rotate. Further, the hinge shaft 310, which is directly or indirectly connected to the second opening and closing gear 250, and the butterfly plate 320 rotate to open the engine intake passage 2 by the butterfly plate 320.

After the second rotating step (S800), the nut 110 fastened with the rod 120 is disengaged from the rod 120 by the locker 130 in the second disengaging step (S900). For example, the locker 130, which has a bar shape and penetrates through the nut 110, is disengaged from the groove 121 of the rod 120 to prevent the rotation force of the nut 110 from being delivered to the rod 120 in the second disengaging step (S900).

As described above, in accordance with the exemplary embodiment of the present inventive concept, it is possible to prevent debris from inflowing into the engine through the engine intake passage 2 at the time of exchanging or cleaning the filter 3 even though no separate safety element is present by opening and closing the engine intake passage 2 of the air cleaner housing 1 prior to exchanging or cleaning the filter 3.

The foregoing exemplary embodiment is only an example to allow a person having ordinary skill in the art to which the present inventive concept pertains (hereinafter, referred to as those skilled in the art) to easily practice the present inventive concept. Accordingly, the present inventive concept is not limited to the foregoing exemplary embodiment and the accompanying drawings, and therefore, a scope of the present inventive concept is not limited to the foregoing exemplary embodiment. Accordingly, it will be apparent to those skilled in the art that substitutions, modifications, and variations can be made without departing from the spirit and scope of the disclosure as defined by the appended claims and can also belong to the scope of the disclosure.

What is claimed is:

1. An operation method of an air cleaner structure for blocking an inflow of debris, the method comprising steps of:
 a first locking step of using a locker to fasten a nut with a rod;
 a first rotating step of rotating the nut to allow the butterfly plate to close an engine intake passage;
 a first disengaging step of disengaging, by the locker, the nut fastened with the rod from the rod;
 a withdrawing step of rotating the nut to withdraw the nut from the rod; and
 a replacing step of replacing a filter,
 wherein a first opening and closing gear which is directly or indirectly connected to the rod, a first connection gear, a flexible cable, a second connection gear, and a second opening and closing gear rotates when rotating force of the nut is delivered to the rod, and
 wherein a hinge shaft which is directly or indirectly connected to the second opening and closing gear and the butterfly plate rotates to close the engine intake passage.

2. The operation method of claim 1, further comprising:
 a connecting step of rotating the nut to connect the nut to the rod and fixing the filter and a filter cover to a supporter which is connected to an air cleaner housing;
 a second locking step of using the locker to fasten the nut with the rod;
 a second rotating step of rotating the nut to allow the butterfly plate to open the engine intake passage; and
 a second disengaging step of disengaging, by the locker, the nut fastened with the rod from the rod,
 wherein the first opening and closing gear which is directly or indirectly connected to the rod, the first connection gear, the flexible cable, the second connection gear, and the second opening and closing gear rotates when the rotating force of the nut is delivered to the rod, and
 wherein the hinge shaft which is directly or indirectly connected to the second opening and closing gear and the butterfly plate rotates to open the engine intake passage.

* * * * *